(12) United States Patent
Brewer, Jr.

(10) Patent No.: US 6,979,040 B1
(45) Date of Patent: Dec. 27, 2005

(54) WEATHER GUARD FOR OPEN-SIDED VEHICLE

(76) Inventor: Richard Clinton Brewer, Jr., 13910 Mandarin Oaks La., Jacksonville, FL (US) 32223

(*) Notice: Subject to any disclaimer, the term of this patent is extended or adjusted under 35 U.S.C. 154(b) by 39 days.

(21) Appl. No.: 10/878,924

(22) Filed: Jun. 28, 2004

(51) Int. Cl.[7] .............................................. B60J 11/00
(52) U.S. Cl. ..................... 296/83; 296/77.1; 296/78.1
(58) Field of Search ............................. 296/77.1, 78.1, 296/83; 135/905; 160/238, 240, 290.1; 280/DIG. 5

(56) References Cited

U.S. PATENT DOCUMENTS

| | | |
|---|---|---|
| 436,900 A | 9/1890 | Morrison |
| 595,228 A | 12/1897 | West |
| 1,448,016 A | 3/1923 | Welshausen |
| 1,786,048 A | 12/1930 | Williams |
| 2,580,776 A | 1/1952 | Herman |
| 3,958,826 A | 5/1976 | Upton |
| 4,331,169 A | 5/1982 | Bonser |
| 4,652,037 A | 3/1987 | Thau et al. |
| 4,667,353 A * | 5/1987 | Zeigler et al. ................. 4/607 |
| 5,010,941 A | 4/1991 | Ross, Sr. et al. |
| 5,016,937 A * | 5/1991 | White ....................... 296/97.7 |
| 5,516,181 A | 5/1996 | Thompson |
| 5,688,018 A | 11/1997 | Simpson |
| 5,921,609 A | 7/1999 | Mills et al. |
| 6,068,008 A | 5/2000 | Caldwell |
| 6,199,932 B1 * | 3/2001 | Welsh et al. ................ 296/77.1 |
| 6,216,714 B1 | 4/2001 | Tucker |
| 6,293,610 B1 | 9/2001 | Howard |
| 6,439,637 B1 * | 8/2002 | Tyrer ........................... 296/79 |
| 6,869,125 B2 * | 3/2005 | Hamm ......................... 296/83 |
| 6,916,059 B2 * | 7/2005 | Feinberg ...................... 296/79 |
| 6,926,334 B1 * | 8/2005 | Diehm ......................... 296/83 |
| 2004/0207229 A1 * | 10/2004 | Diehm ....................... 296/77.1 |
| 2004/0239140 A1 * | 12/2004 | Feinberg .................... 296/77.1 |

* cited by examiner

Primary Examiner—Lori L. Coletta
(74) Attorney, Agent, or Firm—Akerman Seneerfitt

(57) ABSTRACT

A weather guard for an open-sided golf cart or similar vehicle. The weather guard may include a roller mount, and an elongated roller rotatably mounted to the roller mount, the roller defining a roller axis. A transparent, flexible curtain may be secured to the roller. A support may be attached to the roller mount, such that the support attaches the weather guard to a vehicle, with the support extending from the mount generally perpendicular to the roller axis and includes a hook formation designed to hook at least partially around a roof support of the vehicle. At least one guard fastening mechanism may be attached to the roller mount for attaching the weather guard to the vehicle, the guard fastening mechanism being designed to extend through a grab handle provided on the vehicle.

9 Claims, 4 Drawing Sheets

WEATHER GUARD FOR OPEN-SIDED VEHICLE

FIELD OF THE INVENTION

This invention is directed generally to weather guards for open-sided vehicles, and more particularly to a rain shield for a golf cart or a similar vehicle.

BACKGROUND OF THE INVENTION

Golf carts are typically open-sided vehicles having a solid roof. The open sides are useful to allow for easy entrance and exit to the vehicle during use, but do not provide any protection to the occupants during inclement weather. Various doors and screens have been proposed for the sides and back of golf carts and other similar vehicles, but such solutions have not proven to be satisfactory to date. For example, U.S. Pat. No. 5,921,609 to Mills et al. proposes a shade assembly that may be mounted to the side of a golf cart. The shade assembly is opaque, which reduces the visibility afforded to the occupants of the cart. In addition, the Mills shade is designed to be permanently secured to the roof support members, which reduces the height of the side opening of the cart, causing difficulties to the occupants in entering and exiting the cart. Furthermore, although the shade may be wound onto its mounting rod for storage, the winding operation is time consuming and the shade is designed to be folded back and secured upon itself to allow entry and exit. Yet further, the shade does not extend fully to the front and back roof support members, allowing rain to enter the cart around the sides of the shade.

Roller blinds are well known, and their use in golf carts has been suggested. For example, U.S. Pat. No. 3,958,826 to Upton proposes a temporary windshield for golf carts that includes a flexible transparent sheet that is rolled onto a constant tension roller. The windshield may be unrolled when needed, and the lower edge of the material may be secured to the vehicle by fasteners, such as twist-top fasteners. The roller assembly is located within a housing that is mounted to the roof of the golf cart using brackets.

Such prior art screens typically involve some modification to the vehicle to allow for their mounting, such as the attachment of a permanent support bracket to the vehicle roof supports. This is not beneficial in many instances as it may reduce the resale value of the vehicle, and means that the screen is typically permanently in place, even during periods when inclement weather is not expected. It may also mean that retrofitting existing vehicles is difficult to accomplish. In addition, the weather screen, when mounted to the vehicle, tends to reduce the open area available at the vehicle side, which may make entering or exiting the vehicle more difficult.

Thus, there exists a need for a weather guard for an open-sided vehicle that may easily be mounted to the vehicle and that does not require modification to the vehicle frame.

SUMMARY OF THE INVENTION

This invention is directed to a weather guard for an open-sided vehicle. At least one embodiment of the invention relates to a weather guard including a roller mount, and an elongated roller rotatably mounted to the roller mount, which defines a roller axis. A transparent, flexible curtain is secured to the roller. A support is attached to the roller mount, such that the support may be used to attach the weather guard to a vehicle. The support extends from the mount generally perpendicular to the roller axis and includes a hook formation designed to hook at least partially around a roof support of the vehicle. At least one guard fastening mechanism may be attached to the roller mount for attaching the weather guard to the vehicle, wherein the guard fastening mechanism is designed to extend through a grab handle provided on the vehicle. By attaching the weather guard to the open-sided vehicle at pre-existing attachment points, such as a roof support and a grab handle, the shield may be easily and quickly attached to the vehicle without requiring any modification of the vehicle.

In one arrangement, the transparent, flexible curtain may be formed of a vinyl material. Two guard fastening mechanisms may be provided for attachment to a vehicle grab handle. The guard fastening mechanism may include a wing nut. The support may include a bolt-receiving aperture designed to receive a bolt that connects the vertical roof support to the vehicle roof. The roller may be mounted in the roller mount via a spring-loaded roller winding mechanism.

At least one flexible curtain fastener may also be provided at or near a free edge of the flexible curtain for fastening the free edge of the flexible curtain to the vehicle. In one arrangement, the at least one flexible curtain fastener may include an opening designed to receive a hook or protrusion mounted on the vehicle body. In another arrangement, the at least one flexible curtain fastener may include hook and loop fastener material attached to the flexible curtain, designed to attach to a complementary hook and loop fastener material attached to the vehicle body.

An advantage of this invention is that the weather guard may be positioned on a vehicle simply and quickly, and without any modification to the vehicle being necessary. The weather guard may also be removed from the vehicle when inclement weather is not expected, so that the complete vehicle side is available for entry into and exit from the vehicle.

This and other embodiments will be described in more detail below.

BRIEF DESCRIPTION OF THE DRAWINGS

There are shown in the drawings embodiments that are presently described, it being understood, however, that the invention is not limited to the precise arrangements shown.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

Figure 1:
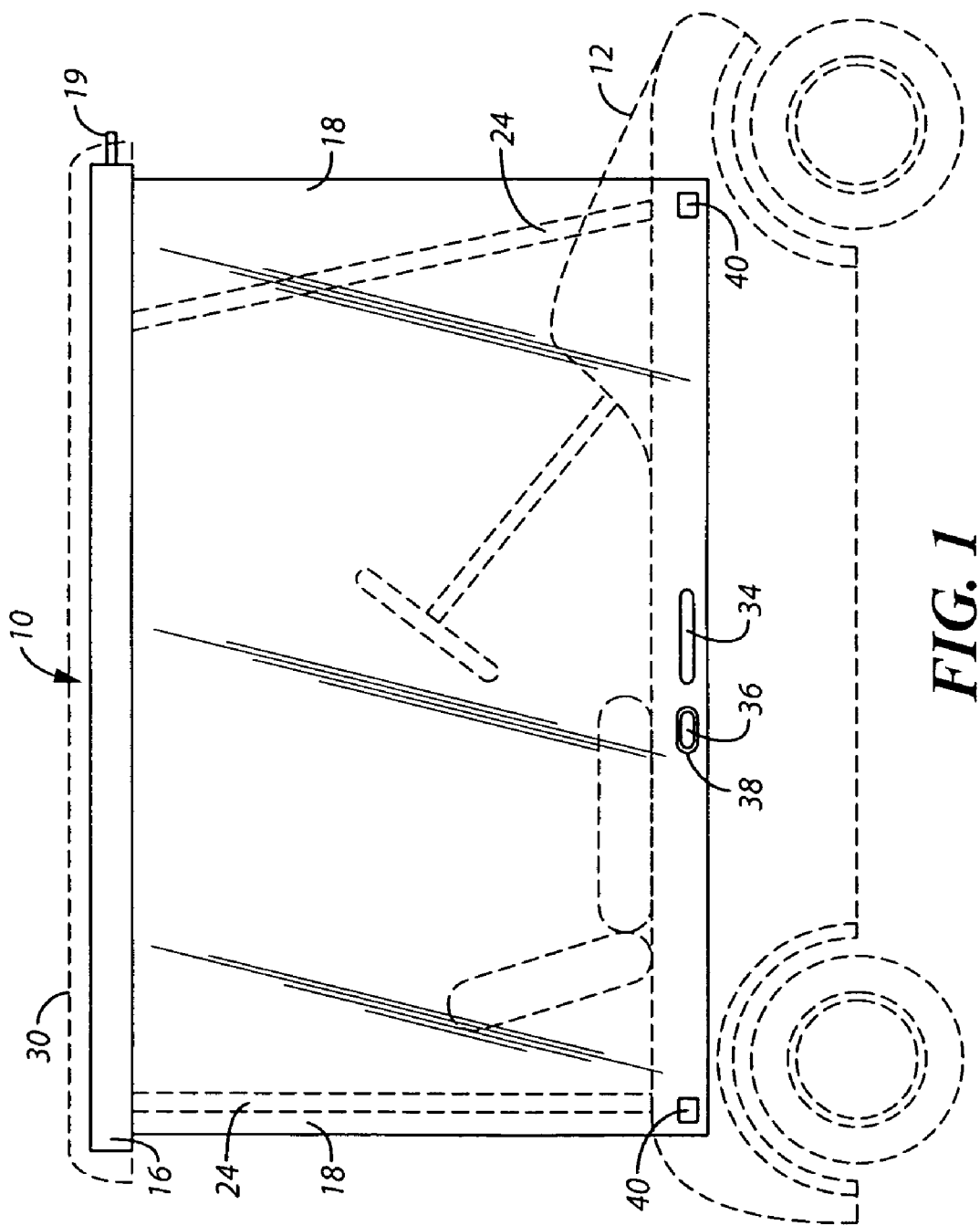
FIG. 1 is a perspective view of an open-sided vehicle with an attached weather guard according to the invention.
Figure 2:
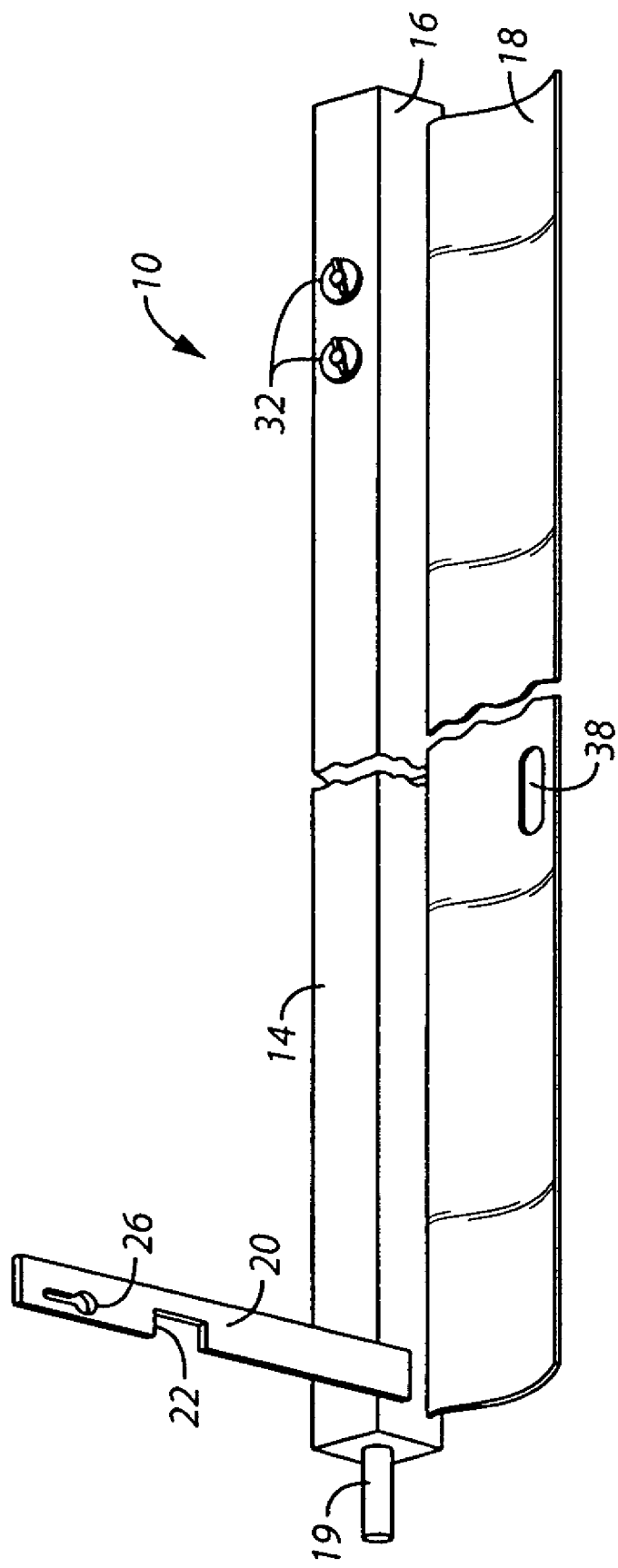
FIG. 2 is a perspective view of a weather guard according to the invention.
Figure 3:
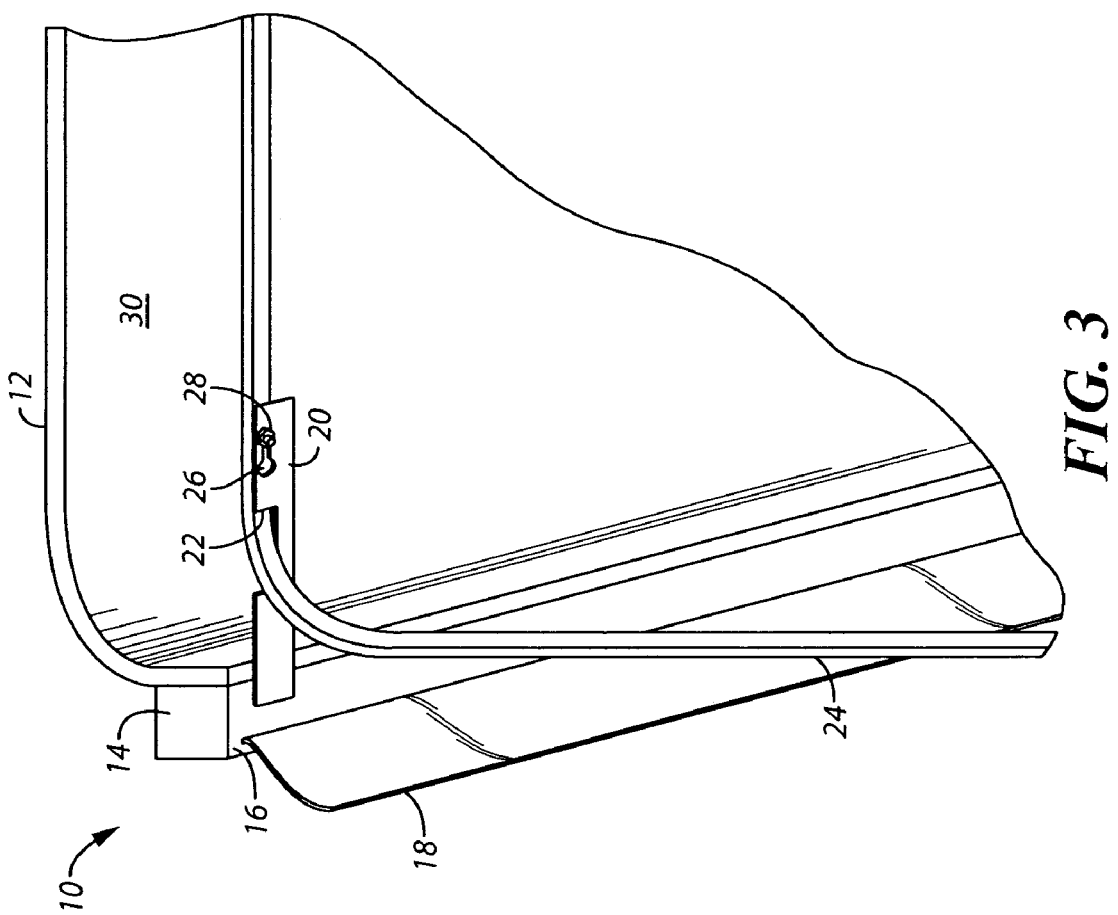
FIG. 3 is a perspective view of a support for a weather guard in position alongside a roof support member of an open-sided vehicle.
Figure 4:
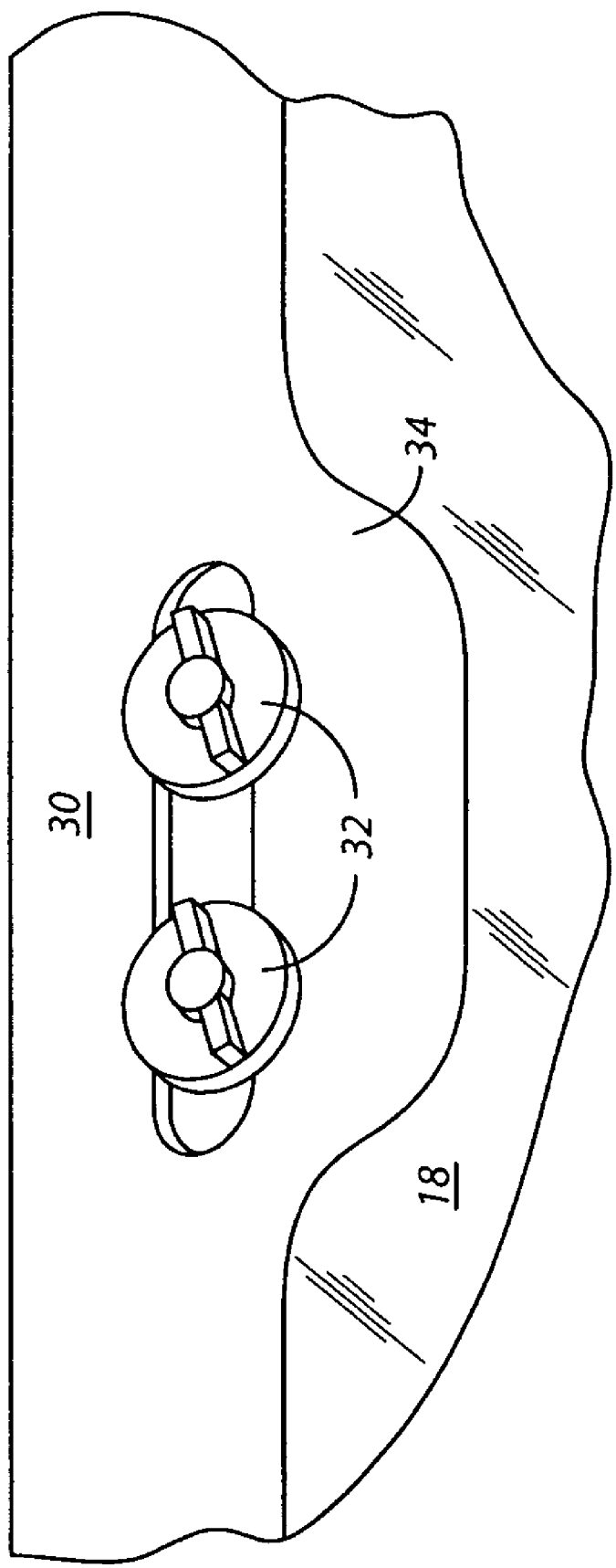
FIG. 4 is a perspective view of two guard fastening mechanisms for a weather guard in position in a grab handle of an open-sided vehicle.

Reference is now made with specific detail to the drawings in which like reference numerals designate like or equivalent elements throughout the several views, and initially to FIGS. 1–4.

This present invention provides a weather guard 10 for an open-sided vehicle 12. The weather guard 10 may be useful to shield the occupants of or cargo carried by the vehicle from rain or other inclement weather. The weather guard 10 may also provide a barrier so that on hot days cool air generated by an air conditioning unit in the vehicle will be retained within the vehicle for a period of time without venting directly to the atmosphere, thus increasing the fuel efficiency of the air conditioning unit.

The weather guard 10 may be formed of a roller mount 14, an elongated roller 16 rotatably mounted to the roller mount 14, and defining a roller axis. A transparent, flexible curtain 18 may be secured to the roller 14. The transparent, flexible curtain 18 may be formed of a vinyl material, although, in alternative embodiments, it may be formed of any suitable material. In one embodiment, the curtain is entirely transparent. In alternative embodiments, the curtain may be translucent, or, in further alternative embodiments, the curtain may have a small transparent area within an opaque or translucent curtain.

The roller mount 14 may be formed of any suitable material, such as a metal or plastic. A suitable metal may be aluminum, which is light weight and does not corrode or rust. The roller may be mounted in the roller mount via a spring-loaded roller winding mechanism 19, which may be of a type that is commonly available, and will not be further defined.

The roller mount 14 may include at least one solid or generally solid side so that a support 20 may be attached to at the solid side by any suitable means, such as welding. The support 20 may be used to attach the weather guard 10 to the vehicle 12. In the illustrated arrangement, the support 20 may extend from the roller mount 14 generally perpendicular to the roller axis and may include a hook formation 22 designed to hook at least partially around a roof support 24 of the vehicle 12. The hook formation 22 may be a simple cut-out from the material of the support 20, as shown, or it may be a more defined L or J-shaped hook, or any other suitable shape that will aid the support 20 in being secured to the vehicle 12. The support 20 may be formed of any suitable material, such as a metal or plastic. A suitable metal may be aluminum, which is light weight and does not corrode or rust.

The support 20 may include a bolt-receiving aperture 26 designed to receive a pre-existing bolt 28 on the vehicle 12, such as a bolt that connects the roof support 24 to the vehicle roof 30. The bolt receiving aperture may be keyhole shaped so that the support 20 may be fitted over the bolt 28 at the wider end of the aperture 26. Beneficially, the bolt 28 is loosened so that the narrow end of the aperture 26 may pass underneath the head of the bolt 28, which may then be tightened securely onto the support 20.

At least one guard fastening mechanism 32 may be attached to the roller mount 14 for additional attachment of the weather guard 10 to the vehicle 12. The guard fastening mechanism 32 may be designed to extend through an existing grab handle 34 provided on the vehicle 12. In the illustrated arrangement, the grab handle 34 is provided on the roof 30 of the vehicle 12, but in other arrangements, the grab handle may be provided on a roof support 24 of the vehicle 12, or on any other suitable position on the vehicle 12. Although the grab handle 34 is illustrated in the figures as being formed integrally with the vehicle roof 30, the invention may be used with grab handles that are separately attached to the roof of the vehicle, and that may be formed in any shape, such as a loop shape, in addition to the bar-shaped handle shown.

The guard fastening mechanism 32 may be in the form of a wing nut, so that it may easily extend through the grab handle 34 for fastening by a user. Two of the guard fastening mechanisms 32 may be provided for attachment to the vehicle grab handle 34, although, depending on the size of the grab handle 34 or other aperture available and the size of the guard fastening mechanisms used, differing numbers of guard fastening mechanisms 32 may be used. In the illustrated arrangement, the two guard fastening mechanisms 32 are of the same type, and are both wing nuts, but it will be appreciated that if more than one guard fastening mechanism 32 is used, each guard fastening mechanism or some of the guard fastening mechanisms may be of a different type.

At least one flexible curtain fastener 36 may be included at or near a free edge of the flexible curtain 18 for fastening the free edge of the flexible curtain 18 to the vehicle 12. The at least one flexible curtain fastener 36 may include an opening 38 designed to receive a hook or protrusion 40 mounted on the vehicle body. The hook or protrusion 40 may include a flexible wire or cord for easy attachment to the opening. As an alternative, the at least one flexible curtain fastener 36 may include a hook and loop fastener material attached to the flexible curtain 18, that may be designed to attach to a complementary hook and loop fastener material attached to the vehicle body.

The weather guard 10 may easily be attached to the vehicle 12 only when inclement weather is expected, or may be left in position permanently. The flexible curtain 18 is easy for a user to pull down and secure in the unrolled position using the flexible curtain fastener 36. When the user elects to enter or exit the vehicle, the flexible curtain 18 may be simply loosened and allowed to roll onto the roller mount 14. Different arrangements of weather guards 10 may be employed for different vehicles 12 to take account of the differing configurations of roof supports 24 and grab handles 34. Alternatively, the support 20 and the guard fastening mechanism or mechanisms 32 may be movable so that they may be altered to fit the particular vehicle 12 that the weather guard is to be used with.

It should be understood that the examples and embodiments described herein are for illustrative purposes only and that various modifications or changes in light thereof will be obvious to persons skilled in the art, and that such modifications or changes are to be included within the spirit and purview of this application. Moreover, the invention may take other specific forms without departing from the spirit or essential attributes thereof.

What is claimed is:

1. A weather guard for an open-sided vehicle comprising:
   a roller mount;
   an elongated roller rotatably mounted to the roller mount, and defining a roller axis;
   a transparent, flexible curtain secured to the roller;
   a support attached to the roller mount, wherein said support attaches the weather guard to a vehicle, wherein the support extends from the mount generally perpendicular to the roller axis and includes a hook formation designed to hook at least partially around a roof support of the vehicle; and at least one guard fastening mechanism attached to the roller mount for attaching the weather guard to the vehicle, wherein the guard fastening mechanism is designed to extend through a grab handle provided on the vehicle.

2. The weather guard of claim 1, wherein the flexible curtain is formed of a vinyl material.

3. The weather guard of claim 1, wherein two of said guard fastening mechanisms are provided for attachment to a vehicle grab handle.

4. The weather guard of claim 1, wherein said at least one guard fastening mechanism includes a wing nut.

5. The weather guard of claim 1, wherein the support includes a bolt-receiving aperture designed to receive a bolt that connects the roof support to the vehicle roof.

6. The weather guard of claim 1, wherein the roller is mounted in the roller mount via a spring-loaded roller winding mechanism.

7. The weather guard of claim 1, further comprising at least one flexible curtain fastener at or near a free edge of the flexible curtain for fastening the free edge of the flexible curtain to the vehicle.

8. The weather guard of claim 7, wherein the at least one flexible curtain fastener comprises an opening designed to receive a hook or protrusion mounted on the vehicle body.

9. The weather guard of claim 7, wherein the at least one flexible curtain fastener comprises hook and loop fastener material attached to the flexible curtain, designed to attach to a complementary hook and loop fastener material attached to the vehicle body.

* * * * *